US010851259B2

(12) United States Patent
Kravitz et al.

(10) Patent No.: US 10,851,259 B2
(45) Date of Patent: Dec. 1, 2020

(54) BARRIER COATINGS FOR FILM AND STRUCTURES

(75) Inventors: Howard S. Kravitz, Wayne, PA (US); Barry J. Hostetter, Landenberg, PA (US)

(73) Assignee: NanoPack, Inc., Wayne, PA (US)

( * ) Notice: Subject to any disclaimer, the term of this patent is extended or adjusted under 35 U.S.C. 154(b) by 678 days.

(21) Appl. No.: 14/236,170

(22) PCT Filed: Aug. 1, 2012

(86) PCT No.: PCT/US2012/049109
§ 371 (c)(1),
(2), (4) Date: Apr. 15, 2014

(87) PCT Pub. No.: WO2013/019833
PCT Pub. Date: Feb. 7, 2013

(65) Prior Publication Data
US 2014/0377545 A1 Dec. 25, 2014

Related U.S. Application Data

(60) Provisional application No. 61/513,853, filed on Aug. 1, 2011.

(51) Int. Cl.
C09D 129/04 (2006.01)
C09D 7/61 (2018.01)
C09D 7/63 (2018.01)
C08J 7/04 (2020.01)
C08K 3/34 (2006.01)
C08K 3/22 (2006.01)
C08K 3/28 (2006.01)
C08K 5/05 (2006.01)
C08K 5/098 (2006.01)
C08K 5/17 (2006.01)
C08K 5/357 (2006.01)

(52) U.S. Cl.
CPC .......... C09D 129/04 (2013.01); C08J 7/0423 (2020.01); C08K 3/22 (2013.01); C08K 3/28 (2013.01); C08K 3/34 (2013.01); C08K 5/05 (2013.01); C08K 5/098 (2013.01); C08K 5/17 (2013.01); C08K 5/357 (2013.01); C09D 7/61 (2018.01); C09D 7/63 (2018.01); C08J 2367/02 (2013.01); C08J 2377/00 (2013.01); C08J 2429/04 (2013.01); C08K 2003/2203 (2013.01); Y10T 428/265 (2015.01)

(58) Field of Classification Search
CPC .......... C08J 7/04; B32B 2255/26; B32B 2307/7244; C08K 2003/2203; C09D 129/04
See application file for complete search history.

(56) References Cited

U.S. PATENT DOCUMENTS

| 3,325,340 | A | | 6/1967 | Forbes | |
|---|---|---|---|---|---|
| 4,885,330 | A | | 12/1989 | Brungardt et al. | |
| 5,102,464 | A | * | 4/1992 | Ou | C04B 14/208 |
| | | | | | 106/415 |
| 5,326,500 | A | | 7/1994 | Friedman et al. | |
| 5,496,649 | A | | 3/1996 | Mallory et al. | |
| 5,571,614 | A | * | 11/1996 | Harrison | C08J 7/047 |
| | | | | | 428/331 |
| 6,232,389 | B1 | * | 5/2001 | Feeney | B60C 1/00 |
| | | | | | 427/245 |
| 6,444,750 | B1 | | 9/2002 | Touhsaent | |
| 7,119,138 | B1 | | 10/2006 | Feeney | |
| 8,080,297 | B2 | * | 12/2011 | Kravitz | C09D 5/024 |
| | | | | | 106/626 |
| 2007/0213446 | A1 | * | 9/2007 | Feeney | C09D 7/61 |
| | | | | | 524/445 |
| 2007/0254160 | A1 | * | 11/2007 | Kravitz | C09D 7/1216 |
| | | | | | 428/423.1 |

(Continued)

FOREIGN PATENT DOCUMENTS

| CN | 1259094 A | 7/2000 |
|---|---|---|
| EP | 0 125 815 A2 | 11/1984 |

(Continued)

OTHER PUBLICATIONS

English Translation of Japanese Application No. 2014-524041: Notice of Reasons for Refusal dated Aug. 2, 2016, 5 pages.
Chinese Application No. 201280037804.7: First Office Action dated Jul. 7, 2015, 10 pages.
International Patent Application No. PCT/US2012/049109: International Search Report and Written Opinion dated Nov. 6, 2012, pp. 12.
MicroLite® Vermiculite Products User's Manual Index; W.R. Grace & Co.; 1992, 17 pages.
Greenland, D.J., Journal of Colloid Science, Adsorption of Polyvinyl Alcohols by Montmorillonite, 18, 1963, pp. 647-664.
Theng, B.K.G., Clays and Clay Minerals, Interactions of Clay Minerals With Organic Polymers, Some Practical Applications, vol. 18, pp. 357-362.

* cited by examiner

Primary Examiner — Gregory Listvoyb
(74) Attorney, Agent, or Firm — BakerHostetler

(57) ABSTRACT

The invention provides coated substrates comprising a substrate and a barrier coating on at least one surface of the substrate. The barrier coating comprises (i) vermiculite, (ii) polymer capable of forming a film, (iii) chemical stabilizing agent selected from materials that contain cationic functionality selected from lithium, alkyl $C_2$-$C_6$ ammonium, allyl ammonium, heterocylclic ammonium, morpholonium, ammonium and amino $C_3$-$C_6$ alkyl carboxylic acids; lithium cations in combination with anions selected from carboxylic, phosphoric, phosphonic, sulfonic and fatty acids, lithium chelating agents, and lithium salts, ammonia, $C_3$-$C_6$ amine, heterocyclic amines, lithium hydroxide, morpholine, and morpholine oleate; and (iv) cross-linking agent. The invention also provides articles coated with such coatings, methods and mixtures for making such coated substrates and articles.

8 Claims, 1 Drawing Sheet

(56) References Cited

U.S. PATENT DOCUMENTS

2009/0098395 A1\* 4/2009 Lu .......................... B05D 7/04
428/454

FOREIGN PATENT DOCUMENTS

| EP | 0 299 351 A1 | 1/1989 |
|---|---|---|
| EP | 0 498 569 A2 | 8/1992 |
| JP | S64-042317 A | 2/1989 |
| JP | 2001-042317 | 2/2001 |
| JP | 2002-504174 A | 2/2002 |
| JP | 2005-126301 | 5/2005 |
| JP | 2009-535489 A | 10/2009 |
| WO | WO 98/003860 A1 | 1/1998 |
| WO | WO 98-056598 A1 | 12/1998 |
| WO | WO 2007/130417 A2 | 11/2007 |
| WO | WO 2010-117900 | 10/2010 |
| WO | WO 2013/019833 A1 | 2/2013 |

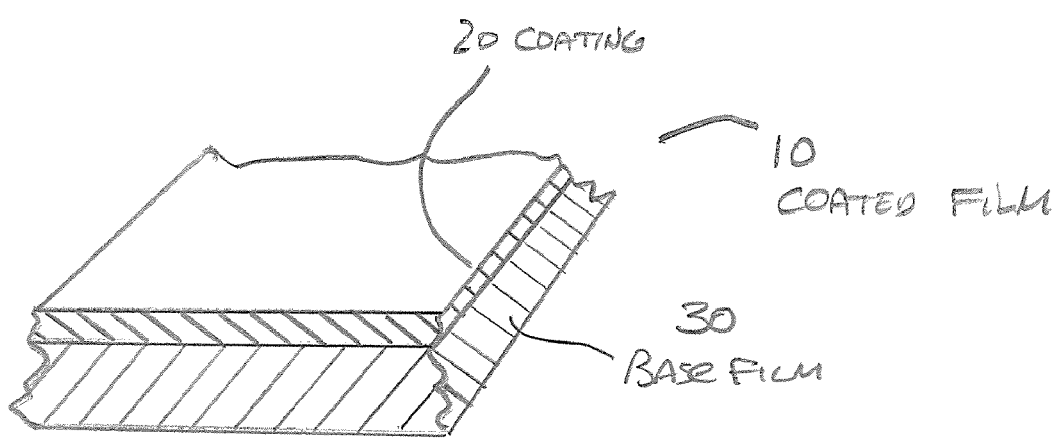

BARRIER COATINGS FOR FILM AND STRUCTURES

CROSS-REFERENCE TO RELATED APPLICATIONS

This application is the National Stage of International Application No. PCT/US2012/049109, filed Aug. 1, 2012, which claims the benefit of U.S. Application No. 61/513,853, filed Aug. 1, 2011, the disclosures of which are incorporated herein by reference in their entireties.

TECHNICAL FIELD

The invention relates to barrier coating containing vermiculite, films and shaped articles containing such coatings, and methods of making such coatings, films and articles.

BACKGROUND

Barrier coatings are widely used in packaging materials to prevent the passage of a permeant molecule or composition, especially to prevent contact between the contents of a package and the permeant. Improving barrier properties is an important goal for manufacturers of films sold for containment of products such as foods, cosmetics, agricultural chemicals, and pharmaceuticals. Injurious permeant chemicals of interest include oxygen, carbon dioxide, water vapor, aromatic and aliphatic hydrocarbons, manufacturing residues, off odors, off flavors, smoke, pesticides, toxic materials, and environmental contaminants and pollutants. Use of typical plastic materials is desirable because they are inexpensive. Plastics, however, are oxygen-permeable to such a degree that the amount of oxygen permeated is much higher than a metal or glass material as used in canning or bottling, or foil used with paper for packaging soup mixes and dry snacks, all of which have an oxygen permeability of substantially zero.

Barrier coatings can also serve to (a) keep a gas inside a package—e.g., a gas used in modified atmosphere packaging, or helium kept inside balloons; (b) keep moisture inside a package so that the contents do not dehydrate; (c) keep a perfume or a flavor inside a package, where perfumes and flavors can be expensive components; or (d) keep undesirable off-odors and flavors from escaping the package. In all these cases, the barrier is maintaining the quality or characteristics of the packaged contents, or preventing contamination of products stored adjacent to or in the vicinity of the packaged product.

Barrier properties arise from both the structure and the composition of the material. The order of the structure, i.e., the crystallinity or the amorphous nature of the material, the existence of layers or coatings can affect barrier properties. The barrier property of many materials can be increased by using liquid crystal or self-ordering molecular technology, by axially orienting materials such as an ethylene vinyl alcohol film, or by biaxially orienting nylon films and by using other useful structures. Internal polymeric structure can be crystallized or ordered in a way to increase the resistance to permeation of a permeant. A material may be selected for a plastic or paper packaging coating that prevents absorption of a permeant onto the barrier surface, and a material may be selected to prevent the transport of the permeant through the barrier. Generally, permeation is concentration and temperature dependent. Permeability is also a function of pressure, where a gradient exists between atmospheric pressure and the structure surrounded by a coated film, etc., e.g., balloons (positive pressure) and vacuum packaging (negative pressure).

Permeation through a polymeric coating is believed to be a multi-step event. First, collision of the permeant molecule, such as oxygen, with the polymer is followed by sorption into the polymer. The permeant migrates through the polymer matrix along a random path, and finally the permeant desorbs from the polymer. The process reaches equilibrium (chemical concentration and pressure) on both sides of the coating. Permeability of a typical molecule through a packaging film is a function of diffusion rate and solubility of the molecule. The diffusion rate measures how rapidly transport of the molecule occurs through the film, and it relates to the ease with which a permeant molecule moves within a polymer. Solubility relates to the concentration or total amount of permeant that may be present in the film. Diffusion and solubility are important measurements of barrier coating performance. Transfer of vapors through packaging films may occur by capillary flow or activated diffusion. Capillary flow involves small molecules permeating through pinholes or microscopic channels of porous media, which is generally an undesirable feature of a barrier coating. Activated diffusion entails solubilization of a permeant into an effectively non-porous medium, diffusion through the film under a concentration gradient, and release from a transverse surface at a lower concentration. Several factors determine the ability of a permeant molecule to permeate through a barrier coating, including size, shape, and chemical nature of the permeant, physical and chemical properties of the polymer, and interactions between the permeant and the polymer.

Various transparent plastic materials having unsatisfactory gas barrier properties are known. Films consisting of a thermoplastic resin, oriented films of polypropylene, polyester, polyamide or the like typically have excellent mechanical properties, heat resistance, transparency and the like and are widely used as packaging materials. However, when these films are used for packaging foods or other goods, they are unsatisfactory for high barrier requirements to oxygen and other gases. Typical barrier materials are a single layer of polymer, a bilayer or multilayer co-extruded or laminated polymer film, a coated monolayer, or a bilayer or multilayer film having one or more coatings on a surface or both surfaces. The most widely used bather polymers for food packaging are ethylene-vinyl alcohol copolymers ("EVOH"), ethylene vinyl acetate copolymers ("EVA"), and polyvinylidene chloride terpolymers ("PVDC"), which offer some resistance to permeation of gases, flavors, aromas, and solvents. PVDC also offers some resistance to moisture. EVOH copolymer resins are available in a wide variety of grades having varying ethylene concentrations. As the vinyl alcohol content is increased relative to the ethylene content, the barrier properties to gases, flavors, and solvents increase. EVOH resins are commonly used in coextrusions or laminations with polyolefins such as polyethylene and polypropylene as structural and/or sealant layers, and with nylon, polyethylene terephthalate ("PET"), poly(lactic acid) ("PLA"), or polyhydroxyalkanoate ("PHA") as structural layers. PVDC emulsions are applied as micron-thick rotogravure coatings to various base film structures such as PET, nylon, polypropylene, poly(lactic acid) ("PLA"), or polyhydroxyalkanoate ("PHA"). Other barrier technologies include metallization with thin coatings of aluminum to various base film structures using vacuum deposition. Moderate barrier polymer materials such as monolayer polyethylene terephthalate, polymethyl pentene, and polyvinyl chloride ("PVC") films are commercially available.

Still other barrier films have been achieved with very thin plasma vapor depositions of oxides of silicon or aluminum (several nanometers thick) on base films and molded polymer structures.

Another barrier technology involves the use of oxygen absorbers or scavengers that are used in polymeric coatings or in bulk polymer materials. Metallic reducing agents such as ferrous compounds and powdered oxide or metallic platinum can be incorporated into barrier systems, which scavenge oxygen by converting it into a stable oxide within the film. Non-metallic oxygen scavengers have also been developed and are intended to alleviate problems associated with metal or metallic tastes or odors. Such systems include compounds including ascorbic acid and various salts and organometallic compounds that have a natural affinity for oxygen. Such molecules absorb oxygen molecules into the interior polymer chemical structure removing oxygen from the internal or enclosed space of packaging materials. Such materials are expensive and, in some cases, the presence of hazardous antioxidants limits their application.

Another method for imparting gas bather properties includes dispersing an inorganic material in a resin. Micronthin polymeric coatings incorporate nano-scale particulate dispersions of clays, such as montmorillonite, hectorite, sodium terasililic mica, sodium taeniolite, and vermiculite into various water-solubilized or emulsified polymers. For example, montmorillonite, hectorite, sodium terasililic mica, or sodium taeniolite may be blended into polyvinyl alcohol. Similarly, polyvinyl alcohol/poly(acrylic acid) blends with these clays are known. In order to prevent clay or vermiculite particles from aggregating or precipitating from solution while mixed with such polymers, they must be extensively pre-treated with, for example, acetic acid or glycine. Still, it is difficult to maintain vermiculite particles in suspension.

Finally, attempts to create barrier by direct addition of various clay particles in extruded and blown thermoplastic films and molded articles are common, but have only modest improvements in bather impermeability versus orders of magnitude improvement using the aforementioned claycontaining coatings.

SUMMARY

In some aspects, the invention concerns films comprising:
base film
a coating on at least one surface of the base film, the coating comprising:
(a) vermiculite,
(b) polymer capable of forming a film,
(c) cross-linking agent,
(d) a chemical stabilizing agent selected from
materials that contain cationic functionality selected from lithium, alkyl $C_2$-$C_6$ ammonium, allyl ammonium, heterocylclic ammonium, morpholonium, ammonium and amino $C_3$-$C_6$ alkyl carboxylic acids;
lithium cations in combination with anions selected from carboxylic, phosphoric, phosphonic, sulfonic and fatty acids, lithium chelating agents, and lithium salts; and
ammonia, $C_3$-$C_6$ amine, heterocyclic amines, lithium hydroxide, morpholine, and morpholine oleate;
the coating being between 0.10μ and 0.70μ thick and the coated film having an oxygen transmission rate of less than 5.0 cc/100 in$^2$ per 24 hours at 1 atmosphere pressure and 23° C.

In some embodiments, the coating has 2 to 65 weight percent of vermiculite.

Preferred chemical stabilizing agents include lithium salts of a $C_2$-$C_{12}$ carboxylic acids. Other preferred chemical stabilizing agents include lithium hydroxide, lithium citrate, lithium erythorbate, lithium stearate, n-butyl amine, morpholine, ammonia, and morpholine oleate.

In some embodiments, the base film comprises one or more of polyethylene terephthalate, glycolised polyester (PET-G), nylon, biaxially oriented polypropylene, oriented polypropylene, cast polypropylene, polystyrene, polyethylene, polyvinyl chloride, polylactic acid (PLA), polyhydroxyalkanoate (PHA), biaxially oriented PET, biaxially oriented PETG, biaxially oriented nylon, biaxially oriented polyethylene, biaxially oriented PLA, biaxially oriented PHA and paper.

While any polymer capable of forming a film that has acceptable barrier properties may be used, preferred polymers capable of forming a film include one or more of polyvinyl alcohol, polyhydroxylic polymer, polyester, EVOH, functionalized PET (sulfonated), poly acrylates, polyvinylacetate and polyvinyl acetate.

It is preferred that the vermiculite have an aspect ratio of at least 5,000, or in some embodiments, at least 10,000. As is known in the art, "aspect ratio" is length or width (e.g. breadth) divided by thickness.

The coated films of the invention can also include additional layers. For example, such layers include one or more of (i) a sealant film contacting the coating and (ii) a primer layer between the base film and the coating. In some embodiments, the coating comprises more than one layer.

The coating layer may contain additional components, These components include one or more of wetting agents, surface tension modifiers, defoamers, antioxidants, antiblock agents, and slip agents.

In addition, the coated film may contain a moisture barrier, or moisture resistant coating or moisture barrier and moisture resistant coating. Any suitable barrier or coating material can be utilized. Suitable coatings include polyvinylidene chloride, acrylic based, urethane based and urethane/acrylic blends and co-polymers. Said coatings may be applied by methods known in the art.

In many end uses, it is necessary or preferred that the components of the coated film are FDA approved or FDA approvable for direct and/or indirect contact with food.

In certain embodiments, the cross-linking agent comprises ethanedial, cyclic urea glyoxal condensate, or blends thereof. In some embodiments, the cross-linking agent is present in an amount of 0.1 to 50 weight percent of the weight of the polymer capable of forming a film.

Some preferred coated films have an oxygen transmission rate of less than 5.0 cc/100 in$^2$ per 24 hours at 1 atmosphere pressure and 23° C. Certain coated films have an oxygen transmission rate of less than 1.0 cc/100 in$^2$ per 24 hours at 1 atmosphere pressure and 23° C.

In other aspects, the invention concerns methods of forming a coated film comprising
applying a coating comprising (a) vermiculite, (b) polymer capable of forming a film, (c) cross-linking agent, and (d) a chemical stabilizing agent selected from materials that contain cationic functionality selected from lithium, alkyl $C_2$-$C_6$ ammonium, allyl ammonium, heterocylclic ammonium, morpholonium, ammonium and amino $C_3$-$C_6$ alkyl carboxylic acids; lithium cations in combination with anions selected from carboxylic, phosphoric, phosphonic, sulfonic and fatty acids, lithium chelating agents, and lithium salts;

lithium salts of carboxylic acids, ammonia, $C_3$-$C_6$ amine, heterocyclic amines, lithium hydroxide, morpholine, and morpholine oleate; and allowing the polymer capable of forming a film to cross-link;

wherein application of the coating being performed on a continuous application line at a speed of at least 150 feet per minute and the coating having a thickness of 0.05 to 0.7 micron after allowing the polymer capable of forming cross-links to form the cross-links.

In some embodiments, the coating is applied using a flexographic, direct rotogravure, reverse rotogravure or slot die process.

Another aspect of the invention concerns suspensions comprising: (a) vermiculite, (b) polymer capable of forming a film, (c) cross-linking agent, (d) a chemical stabilizing agent selected from materials that contain cationic functionality selected from lithium, alkyl $C_2$-$C_6$ ammonium, allyl ammonium, heterocylclic ammonium, morpholonium, ammonium and amino $C_3$-$C_6$ alkyl carboxylic acids;

lithium cations in combination with anions selected from carboxylic, phosphoric, phosphonic, sulfonic and fatty acids, lithium chelating agents, and lithium salts; and lithium salts of carboxylic acids, ammonia, $C_3$-$C_6$ amine, heterocyclic amines, lithium hydroxide, morpholine, and morpholine oleate;

wherein the dispersion contains 2 to 65 weight percent vermiculite and whose viscosity varies by no more than 10% when subjected to normal rotogravure processing conditions.

In yet another aspect, the invention concerns methods for preventing transmission of aroma comprising placing a composition which produces the aroma in a container, the container being substantially composed of a composite film comprising:

base film a coating on at least one surface of the base film, the coating comprising:
(a) vermiculite,
(b) polymer capable of forming a film,
(c) cross-linking agent,
(d) a chemical stabilizing agent selected from
materials that contain cationic functionality selected from lithium, alkyl $C_2$-$C_6$ ammonium, allyl ammonium, heterocylclic ammonium, morpholonium, ammonium and amino $C_3$-$C_6$ alkyl carboxylic acids;
lithium cations in combination with anions selected from carboxylic, phosphoric, phosphonic, sulfonic and fatty acids, lithium chelating agents, and lithium salts; and
ammonia, $C_3$-$C_6$ amine, heterocyclic amines, lithium hydroxide, morpholine, and morpholine oleate;
the coating being between 0.05 and 0.7 micron thick.

In some embodiments, the compound capable of producing the aroma is an oil, eugenol, chocolate, menthol, d-limonene, or cuminaldehyde, coffee, or garbage. In certain embodiments, at least one compound capable of producing the aroma is enclosed in a container, and the container comprises a coated film described herein.

In some embodiments, the invention concerns articles comprising a container and at least one compound in need of protection from at least one of oxygen and moisture, the compound being enclosed in the container, and the container comprising a coated film as described herein.

BRIEF DESCRIPTION OF THE DRAWINGS

FIG. 1 depicts one example of a coated film (10) where a coating (20) resides on a base film (30).

DETAILED DESCRIPTION OF ILLUSTRATIVE EMBODIMENTS

The invention concerns coated films and articles, compositions for such coatings, and methods of coating a substrate where the coating comprises vermiculite; polymer capable of forming a film; chemical stabilizing agent(s) for the vermiculite in the polymer; and cross-linking agent(s). It should be noted that, in some embodiments, a majority of the cross-linking agent is reacted with the polymer capable of forming a film.

Typically, the coatings of the invention are between $0.05\mu$ and $1.0\mu$, preferably $0.15\mu$ to $0.60\mu$ thick.

Suitable chemical stabilizing agents include materials that contain cationic functionality including lithium, alkyl $C_2$-$C_6$ ammonium, allyl ammonium, heterocylclic ammonium, morpholonium, ammonium and amino $C_3$-$C_6$ alkyl carboxylic acids. Suitable chemical stabilizing agents may also be selected from materials that include $C_2$-$C_6$ amines, allyl amines, heterocyclic amines, morphine and ammonia.

Suitable chemical stabilizing agents include materials that contain cationic functionality including lithium, alkyl $C_2$-$C_6$ ammonium, allyl ammonium, heterocylclic ammonium, morpholonium, ammonium and amino $C_3$-$C_6$ alkyl carboxylic acids in combination with anionic counter ions.

Suitable chemical stabilizing agents also include lithium cations in combination with anions selected from carboxylic, phosphoric, phosphonic, sulfonic and fatty acids, lithium chelating agents, and lithium salts.

Suitable chemical stabilizing agents include lithium salts of carboxylic and fatty acids. Also included are salts of saturated aliphatic carboxylic acids such as formic acid, acetic acid, propionic acid, butyric acid, isobutyric acid, valeric acid, isovaleric acid, pivalic acid, caproic acid, caprylic acid, capric acid, malonic acid, succinic acid, glutaric acid, adipic acid, pimelic acid and suberic acid; unsaturated aliphatic carboxylic acids such as acrylic acid, propiolic acid, methacrylic acid, crotonic acid, isocrotonic acid, oleic acid, maleic acid and fumaric acid; and hydroxy carboxylic acids such as lactic acid, tartaric acid, malic acid and citric acid. In some embodiments, the carboxylic acids contain at least 12 carbon atoms (lauric acid, myristic acid, palmitic acid, stearic acid, behenic acid, and lanolin fatty acid, for example). In some embodiments, preferred lithium salts of carboxylic acids include lithium citrate, lithium erythorbate, and lithium stearate. These may be used alone or in combination of two or more.

Suitable chemical stabilizing agents include lithium chelating agents such as lithium CDTA (cyclohexane trans 1,2 diamino tetra acetic acid), lithium EDTA (ethylene diamine tetra acetic acid), lithium citrate, lithium tri carballylate, lithium lactate, and lithium oxalate.

Suitable chemical stabilizing agents include alkyl $C_2$-$C_6$ ammonium cations as linear and branched ammonium cations. In combination with anions selected from fatty acids and alkyl $C_2$-$C_6$ ammonium salts. In some embodiments, preferred ammonium cations are primary ammonium cations. Linear primary ammonium cations include n-propyl ammonium, n-butyl ammonium, n-pentyl ammonium, and n-hexyl ammonium. In certain embodiments, the ammonium cation is a branched $C_2$-$C_6$ ammonium cation. Such branched ammonium cations include 2-propanammonium, 2-butylammonium, 2-pentanammonium, 3-pentanammonium, 2-hexanammonium, and 3-hexaneammonium. In some embodiments, the preferred alkyl $C_2$-$C_6$ ammonium cation is n-butyl ammonium.

Suitable chemical stabilizing agents include alkyl $C_2$-$C_6$ amines as linear and branched amines. In some embodiments, preferred amines are primary amines. Linear primary amines include n-propyl amine, n-butyl amine, n-pentyl amine, and n-hexyl amine. In certain embodiments, the amine is a branched $C_2$-$C_6$ amine. Such branched amines include 2-propanamine, 2-butylamine, 2-pentanamine, 3-pentanamine, 2-hexanamine, and 3-hexaneamine. In some embodiments, the preferred alkyl $C_2$-$C_6$ amine is n-butyl ammonium.

Suitable chemical stabilizing agents include morpholine and morpholonium cations in combination with selected anions including carboxylic and fatty acids and morpholonium salts. In some embodiments, preferred morpholonium stabilizing agents include morpholine and morpholonium fatty acids.

Suitable chemical stabilizing agents include ammonia and ammonium cations in combinations with selected anions including carboxylic and fatty acids and ammonium salts. In some embodiments, preferred ammonium chemical stabilizing agents include ammonia and ammonium salts.

Such agents can be readily obtained from commercial sources and used as is or purified by means known to those skilled in the art.

Without the use of a chemical stabilizing agent, vermiculite particles agglomerate and precipitate in the polymer solution. The use of the chemical stabilizing agents of the instant invention overcomes the necessity for lengthy treatment of vermiculite particles with acetic acid or glycine as described in other patents and literature, to functionalize the platelets so they do not agglomerate.

Vermiculite has aspect ratio of at least 5,000 and is predominantly chemically, thermally or mechanically exfoliated. In some embodiments, the vermiculite has a particle size of 5 to 60 microns in breadth and, in some preferred embodiments, with the majority of particles falling in the range of 10 to 30 microns. In some embodiments, the vermiculite particles are one to three nanometers thick.

In one embodiment, these dispersion agents are used at a weight ratio of dispersion agent to vermiculite ranges from about 0.02 to about 3.0, preferably about 0.1 to about 2.5 or, in some embodiments, about 0.04 to about 1.0. In certain embodiments, the rate ratio of the chemical stabilizing agent to vermiculite platelets (dry basis) is at least 0.0036, 0.012, 0.0061, or 0.4.

In some embodiments, a blend of dispersion agents can be utilized.

In preferred embodiments, the barriers have an oxygen transmission rate (OTR) of less than 0.7 cc/100 square inches per 24 hours at 1 atmosphere and 23° C., and preferably less than 0.4 cc/100 square inches per 24 hours at 1 atmosphere and 23° C. OTR is determined using ASTM D1434.

In some embodiments, the substrate is a base film. The invention is applicable to numerous base films. For example, a barrier coating composition of the invention can be applied to various blown, cast, extruded, etc. films or articles manufactured from polymeric materials selected from polyethylene terephthalate ("PET"); biaxially-oriented polypropylene ("BOPP") and oriented polypropylene ("OPP"); cast polypropylene, polyethylene ("PE"), including high density polyethylene ("HDPE"), low density polyethylene ("LDPE"), and linear low density polyethylene ("LLDPE"); polyvinyl chloride ("PVC"), polystyrene ("PS"), biaxially oriented polystyrene, and expanded polystyrene ("EPS"); polyethylene terephthalate glycol ("PET-G"); ethylene vinyl acetate ("EVA"); ethylene vinyl alcohol ("EVOH"); polyhydroxyalkanoate ("PHA"), polylactic acid ("PLA"); and others, such as poly(acrylonitrile-co-butadiene-co-styrene) polymers, acrylic polymers such as polymethylmethacrylate, poly-n-butyl acrylate, poly(ethylene-co-acrylic acid), poly(ethylene-co-methacrylate); cellophane, cellulosics including cellulose acetate, cellulose acetate propionate, cellulose acetate butyrate and cellulose triacetate; fluoropolymers including polytetrafluoroethylene (for example, Teflon, a registered trademark of DuPont), poly(ethylene-co-tetrafluoroethylene) copolymers, (tetra-fluoroethylene-co-propylene) copolymers, polyvinyl fluoride polymers; polyamides such as nylon-6 and nylon-6,6, including biaxially oriented nylon; polycarbonates; polyesters such as poly(ethylene-co-terephthalate), poly(ethylene-co-1,4-naphthalene dicarboxylate), poly(butylene-co-terephthalate); polyimide materials; vinyl films including (vinyl chloride-co-vinyl acetate) copolymers, polyvinylidene chloride, polyvinyl alcohol ("PVOH"), (vinyl chloride-co-vinylidene dichloride) copolymers; and specialty films including polysulfone, polyphenylene sulfide, polyphenylene oxide, liquid crystal polyesters, polyether ketones, and the like.

The base film may be used as a structural film, or if it can be sealed to itself such as is the case with some polypropylene films, as a sealant film on the inside of a laminated package. Also, if the coated film is a sealant film, it can be laminated to any number of different types of substrates, including but not limited to another coated film, another uncoated film, paper, etc. The base film may also act simultaneously as both a structural film and sealant film, where the coating is applied to a single side, that side facing to the side opposite to the sealant side. Such monoweb structures are common, but not limited to use in packaging baked goods and confectionaries.

Sealant layers may be created by coextrusion, extrusion coating, coating or adhesive lamination.

A film is a flat unsupported section of a polymeric (e.g., plastic) resin whose thickness is much smaller than its width or length. Films are generally regarded as being 0.25 millimeters or less, typically 0.01 to 0.20 mm thick. A sheet may range from about 0.20 mm to several cm, typically 0.3 to 3 mm in thickness. Films and sheets can be used alone or in combination with other sheet, fabric or structural units through lamination, coextrusion or coating. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc. Polymer materials can be formed into a film using a variety of processes including blown polymer extrusion, linear biaxially oriented film extrusion (a process referred in the film industry as tentering) and by casting from molten polymer resin, monomer or polymer (aqueous or organic solvent) dispersion. These methods are well known manufacturing procedures. Skilled artisans can tailor the polymer for a particular end use by controlling molecular weight (the melt index has been selected by the polymer industry as a measure of molecular weight—melt index is inversely proportional to molecular weight, density and crystallinity).

Films may be transparent, white, opaque, metalized, coated, extrusion coated, coextruded. Films may consist of one or more layers. Films may contain coating before or after, may an optional primer coating. Films may contain one or more moisture resistant or moisture barrier coatings. Films may be metalized by vacuum deposition of aluminum. Barrier coated films of the present invention may be metalized by vacuum deposition of aluminum.

A barrier coating composition of the invention may also be applied to a cast article, or an article made my injection molding or blow molding (such as bottles and other closures), thermoforming (e.g., trays), or stamping (e.g., trays). For casting, molten polymer resin or monomer dispersion are typically produced from polyethylene or polypropylene. Occasionally, nylon, polyester and PVC are cast. For roll coating of aqueous based acrylic urethane and PVDC, etc., dispersions are polymerized to an optimum crystallinity and molecular weight before coating. The coating composition of the invention may also be applied to bottles and trays, which are commonly made with PET, polypropylene and polystyrene. Further, a film can be used as a film closure on a rigid plastic container. Such containers can have a rectangular, circular, square, or other shaped cross-section, a flat bottom and an open top. Further, the invention may be used in the formation of blister pack packaging, clam shell type enclosures, tubs, trays, lidding and similar articles of containment. Examples of use include, but are not limited to, bottles, trays, caps, corks, gloves, and condoms.

In some embodiments, a barrier coating composition can be coated on a film to produce a coated film which is then thermoformed or stamped to produce an article. Such articles include, but are not limited to, cups and trays such as shallow cups and trays useful in packaging food.

Often two or more polymer materials are joined in a coextrusion process to produce tailored film or sheet products adapted to a particular end use. One or more polymer types in two or more layers of melt are melted in separate extruders and joined together in a single coextrusion die layering single extrudates together in a single film to have a finished film with versatile properties derived from the individual layers. Layers of the different polymers or resins can be combined by parallel extrusion of the different polymers. The film can be processed conventionally and may be oriented after cooling. Films can contain a variety of additives such as antioxidants, heat stabilizers, UV stabilizers, slip agents, fillers, and anti-block agents.

Alternatively, another film process puts layers together by lamination. Still other structures might be a combination of an extrusion on top of a solid film and a co-extrusion on top of a solid film.

In addition to a film, the barrier coating composition of the invention may also be applied to an article of paper, fabric, fiber, or other material of manufacture. For example, a barrier coating may be applied to a variety of packaging formats to package a variety of items. For example, items may be packaged entirely in a pouch or bag of paper, fabric or other material of manufacture that is coated with a barrier coating of the invention. Paper products include any article of manufacture, at least a portion of which comprises paper coated in accordance with the invention.

The coated paper product may be made totally of paper or partially of paper. The invention encompasses paper products made of either single or multiple layers, e.g., a paper laminate or plastic/paper laminate. In such constructions, plastic coatings are commonly extruded onto paper; clays are usually slurries that are applied to paper with a knife coater (blade on top of paper with a certain gap and pressure). The coating may be applied on one or both sides. There are paper products that are coated (clay or polymer), such that the invention could be applied on top of the clay or polymer coating.

Paper products that are designed to receive food would typically be arranged such that the coatings are not in contact with food. In this instance, a sealant layer is placed between the food and the coating layer.

Other paper products to be treated with the composition of the invention or made with paper treated in accordance with the invention include laundry soap boxes, fabric dryer sheet containers, and industrial wraps. Food containers that may also be treated with a composition of the invention include any wrapper, bag, box, cup, or other paper product capable of covering, holding, or containing a food product, whether hot or cold, wet or dry, such as hamburger wrappers, candy wrappers, pizza and cereal boxes, condiments, soup mixes, coffee, spices and bags for potato chips, peanuts and pet food, among others.

The invention is especially advantageously applied to protect a product from contamination from permeant sources outside a packaging material. Food items are protected from contamination by aromatic and aliphatic hydrocarbons, fluorocarbons, ink, and packaging residue, exhaust from transportation equivalent and other internal combustion engines, etc. Similarly, the invention can advantageously be applied to prevent the escape of certain perfumes from the package (especially expensive perfumes) commonly used in a variety of consumer products such as scented paper products, bar soap, scented bath products, cleaners, fabric softeners, detergents, dry bleaches and disinfectants. The invention can also be applied to packaging of seasonings, spices, coffee, and the like.

Food items are the most common material requiring protection from outside contamination. Further, a variety of materials must be packaged in barrier materials preventing the odor of the material from exiting the package, resulting in the substantial loss of important fragrance notes from packaged materials reducing product value. Further, food odors may readily be transmitted by a variety of packaging materials, attracting insect and rodent pests. Important odors requiring substantial barriers include odors derived from coffee, ready to eat cereal, frozen pizza, cocoa or other chocolate products, dry mix gravies and soups, snack foods (such as potato or corn chips, pretzels, crackers, and popcorn), baked foods, butter or butter-flavor notes, meat products, in particular butter or butter-flavor notes used in the manufacture of microwave popcorn in microwaveable paper containers, fruits and nuts, and so on. Dry pet food (such as dog and cat food, etc.) can also benefit from the invention as it is often important to prevent obnoxious odor from escaping into the environment—in the store and at home.

In other embodiments, it is desired to keep a particular gas within an article of manufacture, such as helium within a balloon, or an inert atmosphere such as nitrogen or argon within a package (including thermo-pane windows). Materials that are readily oxidized, such as reactive chemicals, may be packaged in a container in which ambient atmosphere has been replaced with an inert atmosphere, and the invention serves to exclude oxygen and to preserve the contents of the package (including the inert atmosphere).

The barrier coating compositions of the invention may be applied to a film or other article of manufacture using any number of application methods, including Meyer rod; reverse rotogravure, and direct rotogravure methods; flexographic printing, slot die, and spraying methods; microgravure methods; roll-coating methods such as two-roll bead coat method, bottom-feeding three-roll reverse coat method and the like; knife or blade coating methods; die coat methods; dip coat methods; bar coating methods; and combinations thereof, as well as other art-recognized techniques. When the substrate is a film or sheet, the coating method preferably comprises coating a solution of the barrier coating composition onto the surface of the substrate followed by the drying of the solution. Further heating during lamination or extrusion coating promotes additional curing of the coating. The coating layer thickness may be varied depending upon the kind of substrate and the desired barrier properties, and, in some embodiments, it is preferably about 10 µm or less, more preferably about 1 µm or less, when dry. There is no lower limit, however, and, in some embodiments, the thickness is preferably 10 nm or more—50 nm, 100 nm, 200 nm, 500 nm, or more, in order to obtain effective gas barrier properties in certain embodiments. In some embodiments, the coating is performed on a continuous application line at a speed of at least 10 meters per minute (30 feet per minute), preferably at least 300 meters per minute (900 feet per minute), or more for better economic efficiency.

As long as the salutary effects of the invention are not impaired, the barrier coating composition may contain various additives such as ultraviolet absorbers/blockers, coloring agents, antioxidants, anti-microbials, flame retardants and the like. In some preferred embodiments, these additives have average particle sizes in the nanometer range or smaller (e.g. colloidal antimony flame retardant; colloidal silver; nano-sized titanium dioxide and zinc oxide UV barrier).

Any suitable UV absorbing material can be used. These materials include the oxides of titanium, zirconium, cerium and tin-doped iridium oxides (such as, titanium dioxide, zirconium dioxide, cerium dioxide, indium tin oxide), and the like.

The invention includes articles of manufacture wherein either the coating or films are subsequently laminated with an additional sealant film or extrusion coated with sealant polymers. The sealant may be applied by any means known in the art. The sealant may be one layer or it may be multiple layers. In some embodiments, the sealant is preferably selected from the group consisting of polyethylene (including linear low density polyethylene, high density polyethylene, etc.), polypropylene, and ethylene-vinyl acetate copolymer (EV acetate), poly(lactic acid) ("PLA"), polyhydroxyalkanoate ("PHA") or blends thereof.

In addition, the coated film may contain a moisture resistant barrier or moisture resistant coating. Any suitable barrier or coating material can be utilized. One suitable coating is an acrylic based coating. In some embodiments, use of such a barrier or coating can protect the coating layer of the invention from humidity and extend the life of the oxygen barrier. This may be particularly valuable when the structural film has relatively poor moisture barrier (PET and PLA, for example). It should be noted that the barrier or layer can be applied to protect the coated layer from moisture that is found outside of a package utilizing a barrier coating of the invention or to protect the coated layer from moisture from moist or wet contents of the package. As such, the moisture resistant barrier can be place such that is it is on the "outside" and/or "inside" of the coating layer.

In some embodiments, the moisture resistant barrier or coating has a structure that is a monoweb of sealable resin that can function as both the base (structural) and sealant web in one film. Materials that are commercially in use today include BOPP, PE and PLA—all available with a sealable face. With these films, a coating of the instant invention can be used on the outside of the package, and is therefore readily exposed to high humidity environmental conditions. Under high humidity, not only can the oxygen barrier of coating degrade, the base carrier resin of the coating (polyvinyl alcohol) can sometimes become tacky. The moisture resistant coating can maintain the integrity of the oxygen barrier and the structural integrity of the coating as well.

In some embodiments, arrangement of layers include (from the outside of the package to the inside of the package), include but are not limited to:
  base (structural) film/moisture resistant coating/oxygen barrier coating/sealant film;
  moisture resistant coating/oxygen barrier coating/base (structural) film (sealant side may face to the inside of the package); or
  base (structural) film/oxygen barrier coating/sealant film.

Vermiculite is preferred over other clays because of its planar nature and high aspect ratio. In particular, vermiculite that has been modified into a form with a high percentage of singular platelets is preferred. These vermiculite platelets preferably are 10 to 5,000 angstroms thick and have a surface dimension (length and/or width) of 10 to 50 microns and aspect ratios greater than 5,000. High aspect ratios of vermiculite single platelet length/width to thickness allow numerous platelets to be held in place parallel or nearly parallel to the plane of the coating and for numerous platelets to be closely layered within thin layers of coating, while having sufficient breadth to form a tortuous path to traversing molecules, such as of oxygen. This layered, planar alignment of vermiculite platelets, dispersed within the polymeric coating solution will be maintained during the coating application process and the coating drying process.

Vermiculite platelets are produced through a process of separation or exfoliation. Vermiculite exfoliation to highly singular platelets is known in the art and can be accomplished by mechanical, thermal or chemical means as disclosed in U.S. Pat. Nos. 3,325,340; 4,885,330; 5,102,464; and 5,326,500. Chemically dispersed vermiculite products are available from Specialty Vermiculite Corporation (formally Grace) as Microlite Vermiculite and Microlite Dispersions. Microlite Dispersions are an aqueous dispersion of chemically exfoliated vermiculite. One preferred embodiment of the invention uses Microlite 963 vermiculite.

In some embodiments, the coatings of the invention contain 1 to 65 weight percent vermiculite and the viscosity of the dispersions vary by no more than 20% when subjected to processing conditions on a gravure coater or flexographic printer (conditions), as measured with a standard #2 Zhan cup or Brookfield viscometer.

Suitable polymers used in the compositions include those capable of forming films. Films can be formed by rolling out or laying out the polymer (or solution or suspension of polymer) on a surface and allowing it to form the film. Such films can be formed with or without the application of heat. The films can be formed with or without the presence of a solvent for the polymer. The polymers used to make the coatings (e.g. PVOH, etc.) range in viscosity from 1 to 200 centipoise, preferably between 3 and 65 centipoise.

The polymers of the invention can be delivered to the coating composition either neat or in solution. In some embodiments, the solution is an aqueous solution. In other embodiments, a non-aqueous solvent may be used. Non-aqueous solvents include alcohols (such as methanol, ethanol and isopropanol), dimethylsulfoxide, acetone, methyl ethyl ketone (MEK), and hydrocarbons.

The polymers can be delivered in the form of an emulsion in some embodiments. Urethane polymer is one such example. Another example of a useful emulsion that is based on polyvinylidene chloride (PVDC). It should also be noted that many of the rubbers noted throughout the application can also be delivered in the form of emulsions—e.g. butyl, nitrile, SBR, epichlorohydrin, chloroprene, acrylic rubbers, and the like. In some emulsions, the range of solids is from low percentages (commonly several percent) to more commonly high percentages of as high as 55-60 weight percent. In some embodiments, PVDC is at 55-60 weight percent and urethane is at 30+ weight percent. In each of these cases, the solutions may be diluted (down to 5-10 weight percent, in some cases) to permit optimal handling and application of the coating.

While a wide variety of polymers can be used in the coating, their barrier properties will vary with composition. It should be noted that starting with polymers that have good barrier properties absent the instant coatings typically improve barrier properties by several orders of magnitude. However, if the resin is not a good barrier on its own, the barrier will not be improved as much.

Any polymer that forms a film of desired properties can be used with the invention. Some preferred polymers include polyhydroxylic polymer, urethanes, and rubbers. Suitable polyhydroxylic polymers include polyvinyl alcohol (PVOH) and ethylene-vinyl alcohol copolymer (EVOH) and blends thereof. One preferred PVOH is a higher hydrolyzed PVOH which is more crystalline in nature than lower hydrolyzed PVOH. Higher hydrolyzed PVOH is more crystalline and hence has better integrity (defined as better resistance to gas transmission) at higher levels of relative humidity.

PVOH is typically produced by hydrolyzing poly(vinyl acetate). In this reaction, acetate groups of poly(vinyl acetate) are replaced with alcohol groups through a hydrolysis reaction. The more acetate groups that are replaced, the greater the hydrolysis of the PVOH resin. For example, in a 95% hydrolyzed PVOH resin approximately 5% of the acetate groups remain unchanged. Similarly, in a 99% hydrolyzed PVOH resin, approximately 1% of the acetate groups remain unchanged. In the instant invention, PVOH of various degrees of hydrolysis can be used. In some cases, the degree of hydrolysis is greater than or equal to 90%, 95%, or 99%.

Any natural or synthetic rubber that gives desired properties can be used. Suitable rubbers include polychloroprene, butyl rubber, acrylic rubber, and nitrile rubber. Other synthetic rubbers include those derived from isoprene, butadiene, SBR (styrene/butadiene rubber), isobutene/isoprene, and EPDM (ethylene/propylene/butadiene).

Urethane polymers are well known to those skilled in the art. Suitable urethane polymers include those amenable to forming aqueous dispersions.

Urethane-containing polymers include polyurethanes made by techniques known in the art. In some embodiments, a polyisocyanate compound (aromatic and aliphatic) is reacted with a compound having two or more reactive terminal hydrogen atoms. In some embodiments, the isocyanate is a diisocyanate. In some embodiments, tri-functional or higher isocyanates can be utilized alone or in mixtures with diisocyanates. In some embodiments, aliphatic isocyanates are preferred.

Suitable compounds with reactive terminal hydrogens include polyols such as poly(ethylene glycol), poly(propylene glycol), or polyester polyol. These compounds can be reacted with the isocyanate compound either in the presence or absence of catalysts.

In some embodiments, the urethanes can have polar sites attached thereto to promote water compatibility. Such sites include, carboxylic acid, ether, sulfonic, sulfonium, sulfhydryl, and ammonium groups. See, for example, PCT Patent Application No. WO98/03860.

In some embodiments, the polymer can be formed in situ. A urethane, for example, can be made by reacting a polyisocyanate with suitable compounds to form urethane linkages. Such compositions might be useful in various end uses such as adhesives (a two component adhesive, for example).

Polyester polymers are well known to those skilled in the art. Suitable polyester polymers include those amenable to forming aqueous dispersions. Polyester-containing polymers include polyester polymers made by techniques known in the art. In some embodiments, the polyesters can have polar sites attached thereto to promote water compatibility. Such sites include, carboxylic acid, ether, sulfonic, sulfonium, and sulfhydryl groups.

In some preferred embodiments, the polymers can be cross-linked. Any suitable cross-linking agent that provides desirable properties can be used. Examples of cross-linking agents include ethanedial (Glyoxal 40 L from Clariant Corporation, for example), cyclic urea glyoxal condensate (SunRez 700, for example). In some embodiments, the amount of cross-linker is 0.1 to 50 percent based on weight of the polymer capable of forming a film. See U.S. Pat. Nos. 5,496,649 and 6,444,750.

In some embodiments, the coating composition comprises an aqueous dispersion. In some embodiments, the weight percent of solids is 0.5-10%. In other embodiments, the weight percent of solids is 3-8% or 4-6%.

The invention is illustrated by the following examples which are intended as illustrative and not limiting.

SWIRL TEST—DEFINITION: The test methodology described herein will be referred to as the "swirl test", or simply "the test". The apparatus needed for the test is a 10 ounce plastic cup with tapered walls. The cup measures approximately 2 inches in diameter at the bottom, 3 inches in diameter at the top, and approximately 4 inches in height. Liquid coating is placed into the cup and swirled vigorously for 10 minutes, with fingertips placed at the top of the cup. The speed of rotation is 120 revolutions per minute. The amount of liquid placed in the cup measures between 50 and 75 grams.

When the liquid in the plastic cup is rotated vigorously, the vermiculite platelets are in their singularized format. Thin, light-weight platelets are caught in the rotating pattern of the liquid and their surfaces line up parallel to the rotating liquid. Since the platelets are quite broad in their length and breadth at 10 to 30 microns, they are large enough to reflect light and appear to shine. The sheen or shiny reflection visually defines the swirling pattern of the liquid.

If the platelets agglomerate, the liquid becomes viscous, similar to pudding. In the worst case, the liquid appears to flocculate and has nodules much the same as applesauce. The shiny swirling pattern ceases.

Example 1

A batch of 6.5 percent concentration of polyvinyl alcohol (PVOH) was prepared by dissolving 193.6 kilograms of Elvanol 70-62 (Elvanol is a trademark of DuPont) in 2914.5 kilograms of de-ionized water at 80° C. PVOH was added to pre-heated water with intensive mixing during the addition. Methylparaben was added to the mixture at 0.3 percent of the weight of Elvanol plus water, or 9 kilograms. The solution was stirred and heated overnight before all the PVOH and methylparaben were dissolved. The solution was subsequently cooled and filtered through cheesecloth supported on a stainless steel screen to remove solid impurities. Concentration was checked using a hand-held refractometer and adjusted to account for the water evaporated during the solubilizing step. The evaporated water was replaced with de-ionized water so that the refractometer reading was 7.5 BRIX (based on a known relationship of BRIX reading to concentration, a reading of 7.5 BRIX corresponds to 6.5 percent solids concentration of PVOH in water).

A solution was prepared in a 10-ounce plastic cup. Into the cup was placed 26.1 grams of de-ionized water. An additional 2.9 grams of isopropyl alcohol was added and the contents were mixed. Next, 30.9 grams of the 6.5% PVOH (described above) was added and mixed well. An additional gram of Glyoxal 40 L was added (Glyoxal 40 L is the product designation used by Clariant for ethanedial). Finally, 3.3 grams of Microlite 963 was added to the cup and the mixture was stirred for 5 seconds (Microlite is the trademark of W.R. Grace & Co.—Conn., and Microlite 963 is a 7.5 percent by weight suspension of vermiculite in water). A swirl pattern of particulates was observed, indicating the aligning of platelets in the plane of the motion of liquid. A sheen or shiny reflection appeared as a result of the platelets reflecting light from above.

The "swirl test" was administered to the mixture, according to the definition above. After 6.5 minutes of swirling, the pattern of particulates and the sheen or shiny reflection of light was no longer visible. The viscosity of the mixture increased.

Example 2

A solution was prepared in a 10-ounce plastic cup. Into the cup was placed 26.1 grams of de-ionized water. An additional 2.9 grams of isopropyl alcohol was added and the contents were mixed. To this mix was added 0.3 gram of lithium hydroxide and the contents mixed until the granules were completely dissolved. Next, 30.9 grams of the 6.5% PVOH (described above) was added and mixed well. An additional gram of Glyoxal 40 L was added (Glyoxal 40 L is the product designation used by Clariant for ethanedial). Finally, 3.3 grams of Microlite 963 was added to the cup and mixture was stirred for 5 seconds (Microlite is the trademark of W.R. Grace & Co.—Conn., and Microlite 963 is a 7.5 percent by weight suspension of vermiculite in water). A swirl pattern of particulates was observed, indicating the aligning of platelets in the plane of the motion of liquid. A sheen appeared as a result of the platelets reflecting light from above.

The "swirl test" was administered to the mixture, according to the definition above. After 10 minutes of swirling, the pattern of particulates and the shiny reflection of light remained.

Examples 3-11

Mixtures were prepared according to Example 2, substituting processing aids listed in Table 1 for the lithium hydroxide monohydrate. The "swirl test" was administered to the mixtures, according to the definition above. The swirling patterns of the Microlite 963 particles and the shiny reflection of light remained after 10 minutes.

TABLE 1

| Example number | System | Source | Amount Added |
|---|---|---|---|
| 3 | Lithium hydroxide monohydrate | Spectrum Chemical | 0.3 gram |
| 4 | Lithium citrate | Spectrum Chemical | 0.3 gram |
| 5 | Lithium erythorbate | 1.47 grams LiOH (Spectrum) + 0.2 gram erythorbic acid | 1.67 grams |
| 6 | Lithium stearate | 3.5 grams stearic acid + 0.29 gram LiOH in 100 gms DI water | 0.9 gram |
| 7 | Ammonia | Household ammonia | 0.7 gram |
| 8 | Morpholine | Spectrum Chemical | 0.2 gram |
| 9 | Morpholine oleate | 20 grams morpholine + 6.7 grams oleic acid | 0.3 gram |
| 10 | n-butyl amine | Spectrum Chemical | 0.3 gram |

A series of trials were completed to determine the effective lower limits of three of the stabilizing agents for vermiculite clay platelets listed in Table 1. The following examples can be applied to any of the stabilizing agents. The methodology is an iterative process of determination.

Examples 11-23

A series of concentrations of lithium citrate, n-butyl amine and morpholine were screened for efficacy against the criteria of the swirl test, to determine the lower limits of effectiveness of concentration of each stabilizing agent needed to maintain vermiculite platelet singularity.

A solution was prepared as follows. Into a one-liter bottle was placed 261 grams of de-ionized water. An additional 29 grams of isopropyl alcohol was added and the contents were mixed. Next, 309 grams of the 6.5% PVOH (described above) was added and mixed well. An additional 10 grams of Glyoxal 40 L was added. Each of the dispersing agents listed in Table 2 was added to 20.4 grams of the solution described above, and the contents mixed well. Finally, 1.1 grams of Microlite 963 was added to the cup and the mixture was stirred for 5 seconds. The swirl test was administered to the mixtures. The lengths of time during which the swirling pattern and shiny reflection of light of the vermiculite clay platelets remained unchanged are recorded for each concentration screened. The lower limit of effective concentration was determined by an iterative process of comparing times during which the shiny reflection and swirl pattern of the clay platelets remained; a time of 10 minutes is considered appropriate to effectively maintain platelet singularity during coating application on a commercial rotogravure coater or flexographic printer.

TABLE 2

| Example number | System | Amount Added | Time Swirl pattern lost |
|---|---|---|---|
| 11 | lithium citrate | 0.1 gram | 10+ minutes |
| 12 | lithium citrate | 0.02 gram | 10+ minutes |
| 13 | lithium citrate | 0.004 gram | 10 minutes |
| 14 | n-butyl amine | 0.1 gram | 10+ minutes |
| 15 | n-butyl amine | 0.01 gram | 10+ minutes |
| 16 | n-butyl amine | 0.001 gram | 10+ minutes |
| 17 | n-butyl amine | 0.0001 gram | 4+ minutes |
| 18 | n-butyl amine | 0.0005 gram | 9 minutes |
| 19 | morpholine | 0.1 gram | 10+ minutes |
| 20 | morpholine | 0.01 gram | 10+ minutes |
| 21 | morpholine | 0.001 gram | 9 minutes |
| 22 | morpholine | 0.0001 gram | 6.5 minutes |
| 23 | morpholine | 0.005 gram | 10+ minutes |

The lower limit of efficacy is described as the concentration at which the swirl pattern is maintained for at least 10 minutes. For lithium citrate, that lower limit of concentration is 0.004 gram used in combination with 1.1 grams of Microlite 963. This level of addition represents a ratio of $Li^+$ ion to vermiculite platelets (dry) of 0.0036, given the $Li^+$ ion concentration in Lithium citrate is 7.3835% and the concentration of vermiculite platelets in Microlite 963 is 7.5%. In some embodiments, the weight ratio of lithium cation to vermiculite platelets (dry basis) is at least 0.0036.

For n-butyl amine, the lower limit of concentration is 0.001 gram used in combination with 1.1 grams of Microlite 963. This level of addition represents a ratio of n-butyl amine to vermiculite platelets (dry) of 0.012. In some embodiments, the weight ratio of n-butyl amine to vermiculite platelets (dry basis) is at least 0.012.

For morpholine, the lower limit of concentration is 0.005 gram used in combination with 1.1 grams of Microlite 963. This level of addition represents a ratio of morpholine to vermiculite platelets (dry) of 0.061. In some embodiments, the weight ratio of morpholine to vermiculite platelets (dry basis) is at least 0.061.

In certain embodiments, the rate ratio of the chemical stabilizing agent to vermiculite platelets (dry basis) is at least 0.0036, 0.012, or 0.0061.

Examples 24-35

Mixtures were prepared according to Example 2, substituting potential stabilizing agents listed in Table 3 for lithium hydroxide. The "swirl test" was administered to the mixtures, according to the definition above. The swirling patterns of the Microlite 963 particles and the shiny reflection of light did not last for 10 minutes for any of the candidates. The times at which the swirl pattern started to disappear are noted alongside each candidate listed.

TABLE 3

| Example number | System | Source | Amount Added | Time Swirl pattern lost |
|---|---|---|---|---|
| 26 | Citric Acid | Spectrum Chemical | 0.3 gram | 3.5 minutes |
| 27 | Sodium citrate | Spectrum Chemical | 0.9 gram | 0.5 minutes |
| 28 | Potassium citrate | Spectrum Chemical | 0.3 gram | Immediate upon addition |
| 29 | Magnesium citrate | Spectrum Chemical | 0.3 gram | Immediate upon addition |
| 30 | Calcium citrate | Spectrum Chemical | 0.3 gram | Immediate upon addition |
| 31 | Calcium disodium EDTA | Spectrum Chemical | 0.3 gram | Immediate upon addition |
| 32 | Stearic acid | Spectrum Chemical | 0.3 gram | 3 minutes |
| 33 | Erythorbic acid | Spectrum Chemical | 0.5 gram | 6 minutes |
| 34 | Sodium erythorbate | Spectrum Chemical | 1.8 grams | Immediate upon addition |
| 35 | Sodium lauryl sulfate | Spectrum Chemical | 0.2 gram | 1.5 minutes |
| 36 | Aniline | Spectrum Chemical | 0.3 gram | 6 minutes |
| 37 | n-octylamine | Spectrum Chemical | 0.3 gram | Immediate upon addition |

Examples 38-40

Mixtures were prepared according to Example 1. These mixtures were swirled and the platelets agglomerated. To each of these mixtures was added a dispersing agent as listed in Table 4. In each case, the swirling pattern and sheen re-appeared, indicating a reversal of the agglomeration of Microlite 963 platelets. The solutions were swirled for an additional 10 minutes, and the swirl pattern and sheen remained and were comparable to the qualities of the starting solutions, before swirling.

TABLE 4

| Example number | System | Source | Amount Added |
|---|---|---|---|
| 38 | Lithium hydroxide | Spectrum Chemical | 0.3 gram |
| 39 | Lithium citrate | Spectrum Chemical | 0.3 gram |
| 40 | Morpholine oleate | 20 grams morpholine + 6.7 grams oleic acid | 0.3 gram |

Example 41

A solution was prepared in a 10-ounce plastic cup. Into the cup was placed 35 grams of de-ionized water. An additional 2.9 grams of isopropyl alcohol was added and the contents were mixed. Three-tenths of one gram (0.3 gram) of lithium citrate was added to the contents and mixed until it was dissolved. Next, 6.5 grams of Hydro-Rez 1300D Sulfo-Polyester Polymer Dispersion (30% solids) was added and mixed well (Hydro-Rez is the product of Hexion Specialty Chemicals). Finally, 3.3 grams of Microlite 963 was added to the cup and was mixed for 5 seconds. The ratio of dry vermiculite in Microlite 963 to resin solids was 12.5%, the same as the ratio of the prepared solution in Example 1. And the total percent solids was also at the same level as in Example 1. A swirl pattern of particulates was observed, indicating the aligning of platelets in the plane of the motion of liquid. A sheen appeared on the surface of the liquid, as a result of the surfaces of the platelets reflecting light from above.

The "swirl test" was administered to the mixture, according to the definition above. After 10 minutes of swirling, the mixture remained unchanged.

Example 42

A solution was prepared in a 10-ounce plastic cup. Into the cup was placed 35 grams of de-ionized water. An additional 2.9 grams of isopropyl alcohol was added and the contents were mixed. Next, 6.5 grams of Hydro-Rez 1300D Sulfo-Polyester Polymer Dispersion was added and mixed well. Finally, 3.3 grams of Microlite 963 was added to the cup and was mixed for 5 seconds. A swirl pattern of particulates was observed, indicating the aligning of platelets in the plane of the motion of liquid. A sheen appeared on the surface of the liquid, as a result of the platelets reflecting light from above. The "swirl test" was administered to the mixture, according to the definition above. After 2 minutes of swirling, the solution became viscous, the swirl pattern disappeared and soft nodules of solids appeared, as the platelets agglomerated.

Three-tenths (0.3) of one gram of lithium citrate was then added to the mixture. Within 2 minutes, the viscosity of the solution was reduced, the original swirl pattern re-appeared and the sheen from the reflection of platelets also re-appeared. The solution was further swirled for 10 minutes, with no change to the appearance or viscosity of the solution.

Example 43

Ten (10) grams of Fine Particle Size Vermiculite (FPSV) was mixed in 100 grams to de-ionized water. (FPSV is a product designation of W.R. Grace & Co.—Connecticut, which is furnace expanded and mechanically singularized vermiculite.) To this solution was added 10 grams of lithium citrate. This solution was stirred with a magnetic stirrer for 36 hours. The solution was labeled "FPSV-a".

A similar solution using FPSV was made without lithium citrate; the solution was mixed until the FPSV was thoroughly blended into the de-ionized water and labeled "FPSV-b". The solution was stirred with a magnetic stirrer for 36 hours.

Two identical solutions were mixed into two, 10-ounce cups as follows. Into each cup was placed 26.1 grams of de-ionized water. An additional 2.9 grams of isopropyl alcohol was added and the contents were mixed. Next, 30.9 grams of the 6.5% PVOH (as prepared in Example 1) was added and mixed well. One (1) gram of Glyoxal 40 L was added to each cup. Finally, into the first cup was added 2.5 grams of FPSV-a, and into the second cup was added 2.5 grams of FPSV-b.

A third solution was prepared according to Example 4, utilizing lithium citrate and Microlite 963.

Each of the three solutions was swirled for 10 minutes, according to the swirl test. During and following the swirl test, a swirling pattern was seen in all three solutions, but only the sample made with Microlite 963 exhibited a sheen or shiny reflection of light from above.

Example 44

FPSV-a and FPSV-b solutions (see Example 43) were set at rest for 2 hours. A filter cake was seen on the bottoms of the cups containing these solutions, and a liquid remained above each filter cake. The liquids were not clear, indicating the presence of unsettled vermiculite particles remaining in the liquids. The amounts of filter cakes seen in each case was different: more filter cake was seen in FPSV-b (no Lithium Citrate added) than in FPSV-a (the solution that contained Lithium Citrate).

The liquids in FPSV-a and FPSV-b were decanted, leaving the filter cakes from each behind. A swirl pattern and sheen or shiny reflection was seen in each solution. The shiny reflection in FPSV-a was more prevalent than in FPSV-b. Percent solids was measured for each of FPSV-a and FPSV-b. Small metal, disposable cups were weighed; solutions were add to the cups and weighed again. The cups with the solutions were placed in an oven at 350° F., and the liquids were evaporated. The cups with dried vermiculite were weighed again. The percent solids for each was calculated. The decanted solution from FPSV-a contained 3.125% solids, while the decanted solution from FPSV-b contained 0.955% solids, indicating that the addition of lithium citrate to FPSV-a had further exfoliated the vermiculite platelets in this solution of FPSV.

Both the decanted solutions of FPSV were further formulated, as follows. In each case, the ratio of vermiculite to resin was 12.5% and the total percent solids was 4.5%.

Into a 10-ounce cup was placed 17.0 grams of de-ionized water. An additional 2.5 grams of isopropyl alcohol was added and the contents were mixed. Next, 30.9 grams of the 6.5% PVOH (as prepared in Example 1) was added and mixed well. One (1) gram of Glyoxal 40 L was added to the cup. Finally, 8.0 grams of the solution decanted from FPSV-a was added and mixed. The swirl test was administered. Initially, a shiny reflection was seen on the surface of the solution, comparable to the reflection of solution made with Microlite 963 in Example 2 above. After 10 minutes or continuous swirling, the swirl pattern and shiny reflection remained.

Into a 10-ounce cup was placed 1.6 grams of isopropyl alcohol. Next, 30.9 grams of the 6.5% PVOH (as prepared in Example 1) was added and mixed well. One (1) gram of Glyoxal 40 L was added to the cup. Finally, 26.2 grams of the solution decanted from FPSV-b was added and mixed. The swirl test was administered. Initially, a shiny reflection was seen on the surface of the solution, comparable to the reflection of solution made with Microlite 963 in Example 2 above. After 2.5 minutes or continuous swirling, the swirl pattern and shiny reflection started to disappear, and by 6 minutes, the swirl pattern and shiny reflection were gone. To this solution was added 0.2 grams of lithium citrate. The solution was swirled and the swirl pattern and shiny reflection first seen when this solution was mixed re-appeared.

Films were prepared from the two solutions containing FPSV-a and FPSV-b. These films were drawn onto 48 gauge PET films using a #15 Meyer Rod. Once drawn, the films were dried using a blow dryer. In addition, a film was drawn in similar fashion using the coating prepared in Example 2, which contained Microlite 963. The films were compared for clarity and were further evaluated for Oxygen Transmission Rate (OTR). The films drawn using solutions based on FPSV-a and Microlite had similar levels of clarity, while the film drawn from the solution based on FPSV-b was cloudy. The OTRs of the three films were similar at 0.02 cc/100 int-day-atm.

The results of the swirl tests in this Example and the clarity of the films were further indications of the lithium citrate further exfoliating the FPSV solution to singularized vermiculite platelets, to a similar degree of exfoliation of Microlite 963.

Example 45

Into a 55-gallon plastic drum was placed 100 pounds of de-ionized water. Additionally, the following components and weights were added to the de-ionized water with vigorous mechanical agitation following the addition of each component: 26.5 grams of DeeFo PI40 anti-foaming agent (DeeFo is a trademark of Munzing Chemie); 11.1 pounds of isopropyl alcohol; 118.4 pounds of 6.5% solids solution of Elvanol 70-62 as described in Example 1; 3.83 pounds of Glyoxal 40 L. Finally, 12.6 pounds of Microlite 963 were added to the mix with gentle stirring. No stabilizing agent for vermiculite was added. The viscosity of the mix was measured, using a #2 Zhan cup. The viscosity was measured at 23.2 seconds.

The contents of the prepared solution were placed into a coating pan used on a PSi SC1000, 64-inch wide direct rotogravure press. An anilox cylinder @ 150 lines per inch and a cell volume of 10 bcm (billion cubic microns per square inch) rotated in the coating pan; a metal doctor blade was used to wipe excess coating from the cylinder. This coating was then applied to a 48-gauge PET flexible film at a thickness of 0.25 microns dry. During this application process, the coating in the pan had a sheen, as described in the definition of the swirl test above.

The coating was removed from the coating pan into the 55-gallon drum used to prepare the solution. Vigorous mechanical agitation was applied to the mixture for 12½ minutes. After mixing, the solution had thickened. The solution did not have a sheen; rather, it appeared to have the consistency of applesauce. The viscosity of this solution was 27.5 seconds, using a #2 Zhan cup.

This solution was placed back into the coating pan of the PSi direct gravure press and additional PET film was coated.

A comparison of the oxygen transmission rates (OTRs) of the films prepared from each of the two runs (before and after vigorous agitation) showed an increase in OTR from 0.02 cc/100 in$^2$ (per 24 hours @ 1 atmosphere and 23° C.) prior to mechanical shear to 1.1 cc/100 in$^2$ after mechanical agitation, a loss of barrier of more than an order of magnitude, or $10^{1.74}$.

Example 46

Into a 55-gallon plastic drum was placed 100 pounds of de-ionized water. Additionally, the following components and weights were added to the de-ionized water with vigorous mechanical agitation following the addition of each component: 26.5 grams of DeeFo PI40 anti-foaming agent; 11.1 pounds of isopropyl alcohol; 250 grams of lithium hydroxide monohydrate stabilizing agent; 118.4 pounds of 6.5% solids solution of Elvanol 70-62 as described in Example 1; 3.83 pounds of Glyoxal 40 L. Finally, 12.6 pounds of Microlite 963 were added to the mix with gentle stirring. The viscosity of the mix was measured, using a #2 Zhan cup. The viscosity was 23.9 seconds.

The contents of the prepared solution were placed into a coating pan used on a PSi SC1000, 64-inch wide direct gravure press. An anilox cylinder @ISO lines per inch and a cell volume of 10 bcm (billion cubic microns per square inch) rotated in the coating pan; a metal doctor blade was used to wipe excess coating from the cylinder. This coating was then applied to a 48-gauge PET flexible film at a thickness of 0.25 microns dry. During this application process, the coating in the pan had a sheen, as described in the definition of the swirl test above.

The coating was removed from the coating pan into the original 55-gallon drum used to prepare the coating solution. Vigorous mechanical agitation was applied to the mixture for 10½ minutes. After mixing, the solution appeared unchanged, and the solution continued to maintain its original swirling pattern and sheen. The viscosity of this solution was 25.6 seconds, using a #2 Zhan cup.

This solution was placed back into the coating pan of the PSi direct gravure press and additional PET film was coated.

The oxygen transmission rates (OTR) of the films prepared from each of the two runs (before and after vigorous agitation) was measured and remained unchanged at 0.02 cc/100 in$^2$ (per 24 hours @ 1 atmosphere and 23° C.).

Example 47

A 48 gauge PET film was coated with an acrylic based moisture resistant coating. The coating was applied with a #3 Meyer Rod to a dried coating thickness of approximately 1 micron. A primer of MICA A131X was applied on top of the moisture resistant coating with a #3 Meyer Rod to a dried coating thickness of 0.05 micron. NanoSeal oxygen barrier coating was prepared according to Example 3 of the subject application. This coating was applied on top of the primer coating, using a #15 Meyer Rod to a dried coating thickness of 1.8 microns. A similar coated film was prepared without the inclusion of the acrylic based moisture resistant coating. Oxygen transmission rates (OTRs) were measured using a Model 8001 permeation testing machine from Illinois Instruments. The films were placed onto the machine with the PET film facing the oxygen-emitting side and the NanoSeal oxygen barrier coating facing the nitrogen-emitting side. The results are listed for various conditions in Table 5.

TABLE 5

| Sample | Temperature | Oxygen Relative Humidity, % | Nitrogen Relative Humidity, % | Oxygen Barrier, cc/100 in$^2$/day-atm |
|---|---|---|---|---|
| Without acrylic based moisture resistant coating | 23° C. | 0 | 0 | 0.035 |
| | | 65 | 0 | 0.045 |
| | | 75 | 0 | 0.180 |
| | | 85 | 0 | >2.0 |
| With acrylic based moisture resistant coating | 23° C. | 0 | 0 | 0.035 |
| | | 65 | 0 | 0.035 |
| | | 75 | 0 | 0.063 |
| | | 85 | 0 | 0.110 |

Example 48

AET CHZ BOPP, one side sealable, one side flame treated film at 122 gauge was coated on the flame treated side with MICA A131X on a PSi SC1000, 64-inch wide direct gravure press to a coating thickness of 0.02 gram per square meter. NanoSeal oxygen barrier coating prepared according to Example 3 was applied on top of the primer to a coating thickness of approximately 0.32 gram per square meter, and on top of the NanoSeal coating was applied an acrylic based moisture resistant coating to a thickness of approximately 0.45 gram per square meter. A similar film was prepared with the inclusion of the acrylic based moisture resistant coating. Oxygen transmission rates (OTRs) were measured using a Model 8001 permeation testing machine from Illinois Instruments. The films were placed onto the machine with the acrylic based moisture resistant coating side or NanoSeal side facing the oxygen-emitting side and the BOPP sealable side facing the nitrogen-emitting side. The results are listed for various conditions in Table 6.

TABLE 6

| Sample | Temperature | Oxygen Relative Humidity, % | Nitrogen Relative Humidity, % | Oxygen Barrier, cc/100 in$^2$/day-atm |
|---|---|---|---|---|
| Without acrylic based moisture resistant coating | 13° C. | 0 | 0 | 0.35 |
| | | 65 | 0 | >4.0 |
| With acrylic based moisture resistant coating | 13° C. | 0 | 0 | 0.35 |
| | | 65 | 0 | 0.65 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Example 49

A batch of 9.565 percent concentration of PVOH was prepared by dissolving 100 pounds of Celvol® 107 (Celvol is a trademark of Celanese Corporation) in 900 pounds of de-ionized water at 190 to 205° F. Methylparaben was added to the mixture at 0.1 percent of the weight of Celvol, or 0.1 pound to prevent formation of microbes. The solution was heated for 45 minutes before all the PVOH and methylparaben were dissolved. The solution was subsequently cooled and filtered through a 80-mesh screen to remove solid impurities. Concentration was checked using a hand-held refractometer and adjusted to account for the water evaporated during the solubilizing step. The evaporated water was replaced with de-ionized water so that the refractometer reading was 11.0 BRIX (A reading of 11.0 BRIX corresponds to a PVOH concentration of 9.565 percent based on a known relationship of BRIX reading to concentration, where the concentration of PVOH=1.15×BRIX.)

A coating masterbatch was prepared by mixing 6437 grams of the 9.565 percent PVOH solution with 9603 grams of de-ionized water. To this mixture was added 239 grams of a wax containing morpholine. The mixture was gently stirred for 20 seconds. To this mixture was further added 797 grams of Glyoxal 40 from Clariant Corporation (Glyoxal 40 L is the product designation used by Clariant for ethanedial). This mixture was gently stirred for 20 seconds. This masterbatch was placed into a 5-gallon container and transported to a production facility together with a separate container containing 1 gallon of Microlite® 963 (Microlite is the trademark of W.R. Grace & Co.—Conn., and Microlite 963 is a 7.5 percent by weight suspension of vermiculite in water).

Once at the production facility, the 5-gallon container of the masterbatch and 1992.5 grams of clay platelets were mixed together and placed into a reservoir next to a Dri-Tec waterbased coater laminater, with a machine width of 57 inches. Coating in the reservoir was pumped using a diaphragm pump to a pan in which a 140 line analox cylinder was partially submerged into the coating. A doctor blade applied to the cylinder maintained the correct amount of coating on the cylinder for transfer to a 37-inch wide 48 gauge PET film treated with a corona treater to 50+ dyne-cm. The coating was applied to the PET film at a machine speed of 450 feet per minute. A smoothing bar rotating opposite to the direction of the film was used to improve the uniformity of the coating on the film. A 25-foot dryer operating at 240° F. was used to dry the coating. The resulting coating weight was measured at 0.0034 grams per 100 cm$^2$, or a thickness of 0.27 micron, using a calculated density of the dried coating at 1.2 g/cc.

The coated PET film was then laminated to a 1.6 mil cast polypropylene (CPP) sealant film using a Nordmechanica Super Simplex solventless laminator. The adhesive used was Tycel 7668/7276, a two-part solventless urethane from Liofol. (Liofol is a division of Henkel Corporation.)

The finished laminated bather film was subsequently formed into bags 6 inches by 6 inches using an impulse sealer.

These bags were then separately filled with various herbs and spices, including whole cloves, ground cloves, cinnamon, peppermint and orange peel powder, and were then heat sealed with an impulse sealer. The bags were placed into a heating chamber at 104° F. (40° C.) for 90 days. Bags of each were placed in a freezer at −10° F. (−23° C.) to function as controls. At each 30-day interval after the aging cycle commenced, several packages of each were removed from the oven and freezer and were subjectively tested for flavor and fragrance by a professional taste tester. No differences were noted at each evaluation interval over the 90-day storage cycle.

At the conclusion of the 90-day storage cycle, the samples of whole and ground cloves, cinnamon and peppermint were analyzed using a steam volatile oil (SVO) method, according to ASTA test method 5.0. The amounts of oils captured at this time interval were within the experimental error of the test methodology one (1) percentage point. See Table 1. Based on these results, it was concluded that the aged samples had not lost any volatile oils. This result was comparable to results with a standard package construction consisting of paper/polyethylene film/foil/polyethylene film, where the foil at 0.0003 inch is the barrier component. Expected loss of volatile oils without barrier is considerable at 25 to 50 percent over the course of a 90-day storage at elevated temperature.

TABLE 7

SVO Results (%)

| Sample | Time | | |
|---|---|---|---|
| | 0 | 3 weeks | 11 weeks |
| Cloves, whole | 18.3 | 17.5 | 17.5 |
| Cloves, ground | 18.0 | 18.0 | 18.0 |
| Cinnamon | 4.0 | 4.0 | 4.0 |
| Peppermint | 2.9 | 2.6 | 2.3 |

Example 50

A barrier coating formulation was manufactured as follows. Into a 55-gallon plastic drum was placed 49.3 kilograms of de-ionized water. Additionally, the following components and weights were added to the de-ionized water with vigorous mechanical agitation following the addition of each component: 47.9 grams of DeeFo PI40 anti-foaming agent; 8.6 kilograms of isopropyl alcohol; and 450 grams of lithium hydroxide monohydrate stabilizing agent. The mixture was stirred for 1 hour until the lithium hydroxide monohydrate stabilizing agent was dissolved. Next, 115.9 pounds of 10.25% solids solution of Elvanol 90-50 stabilized with 3 percent by weight of the Elvanol was slowly added to the de-ionized water/IPA/etc. solution described above and mixed well with slow agitation for 10 minutes. Finally, 5.8 kilograms of Glyoxal 40 L was added slowly to the mixture and was agitated slowly for 10 minutes. Finally, 11.3 kilograms of Microlite 963 were added to the mix with gentle stirring. The viscosity of the mix was measured, using a #2 Zhan cup. The viscosity was 28 seconds.

The contents of the prepared solution were placed into stations 4 and 8 of a Windmoeller & Hoelscher (W&H) Miraflex 8-station flexographic press. Into station 1 of the press was placed A131X PEI primer coating from MICA Corporation, Shelton, Conn. And the bather coating described above was placed into Stations 4 and 8. A biaxially oriented polypropylene BA18 film from Inteplast Corporation was run thru the coater with a corona pre-treatment, and the resulting coat weights of the primer and barrier coating were measured. The dry coat weight of the primer was measured at 0.05 gram per square meter, and the aggregate dry coat weight of the barrier coating was measured at 0.38 gram per square meter.

The oxygen transmission rates (OTR) of the coated film was 0.23 cc/100 in$^2$ (per 24 hours @ 1 atmosphere and 23° C.).

What is claimed:

1. A coated film comprising:
   base film
   a coating on at least one surface of said base film, said coating comprising:
   (a) vermiculite,
   (b) polymer capable of forming a non-elastomeric film,
   (c) cross-linking agent,
   (d) chemical stabilizing agent comprising at least one of
      materials that contain cationic functionality comprising at least one of lithium, alkyl $C_2$-$C_6$ ammonium, allyl ammonium, heterocylclic ammonium, morpholonium, and amino $C_3$-$C_6$ alkyl carboxylic acids;
      lithium cations in combination with anions comprising at least one of carboxylic, phosphoric, phosphonic, sulfonic and fatty acids, lithium chelating agents, and lithium salts; and
      ammonia, $C_3$-$C_6$ amine, heterocyclic amines, lithium hydroxide, morpholine, and morpholine oleate;
   said coating being between 0.10μ and 0.70μ thick and said coated film having an oxygen transmission rate of less than 5.0 cc/100 in$^2$ per 24 hours at 1 atmosphere pressure and 23° C.; and
   wherein the weight ratio of the cation portion of said chemical stabilizing agent to vermiculite is at least 0.0025.

2. The coated film of claim 1, wherein said chemical stabilizing agent is a lithium salt of a $C_2$-$C_{12}$ carboxylic acid, lithium hydroxide, lithium citrate, lithium erythorbate, lithium stearate, n-butyl amine, morpholine, ammonia, or morpholine oleate.

3. The coated film of claim 1, wherein said base film comprises one or more of polyethylene terephthalate, glycolised polyester (PET-G), nylon, biaxially oriented polypropylene, oriented polypropylene, cast polypropylene, polystyrene, polyethylene, polyvinyl chloride, polylactic acid (PLA), polyhydroxyalkanoate (PHA), biaxially oriented PET, biaxially oriented PETG, biaxially oriented nylon, biaxially oriented polyethylene, biaxially oriented PLA, biaxially oriented PHA and paper.

4. The coated film of claim 1, wherein the vermiculite has an aspect ratio of at least 5,000.

5. The coated film of claim 1, additionally comprising a moisture resistant layer or coating.

6. The coated article of claim 1, wherein the polymer capable of forming a non-elastomeric film comprised at least one of polyvinyl alcohol, polyhydroxylic polymer, polyester, ethylene vinyl alcohol functionalized polyethylene terephthalate (sulfonated), poly acrylates, and polyvinyl acetate.

7. The coated article of claim 1, wherein the polymer capable of forming a non-elastomeric film comprises polyvinyl alcohol.

8. The coated film of claim 1, wherein the weight ratio of the cation portion of said chemical stabilizing agent to vermiculite is 0.01 to 0.2.

* * * * *